US012346905B2

(12) United States Patent
Agrawal et al.

(10) Patent No.: US 12,346,905 B2
(45) Date of Patent: *Jul. 1, 2025

(54) SYSTEMS AND METHODS FOR SEAMLESSLY PROCESSING TRANSACTIONS USING DISTRIBUTED LEDGER TECHNOLOGY IN A LEGACY SYSTEM INFRASTRUCTURE

(71) Applicant: CITIBANK, N.A., New York, NY (US)

(72) Inventors: Aseem Agrawal, Singapore (SG); Chirdeep Singh Chhabra, Singapore (SG); Karim Abdelkader Chabane, Hong Kong (CN)

(73) Assignee: CITIBANK, N.A., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/596,273

(22) Filed: Mar. 5, 2024

(65) Prior Publication Data

US 2024/0211946 A1    Jun. 27, 2024

Related U.S. Application Data

(63) Continuation of application No. 17/498,622, filed on Oct. 11, 2021, now Pat. No. 11,935,052.

(51) Int. Cl.
*G06Q 20/40* (2012.01)
*G06F 16/27* (2019.01)
(Continued)

(52) U.S. Cl.
CPC .......... *G06Q 20/401* (2013.01); *G06F 16/27* (2019.01); *G06Q 20/36* (2013.01); *G06Q 20/3829* (2013.01); *G06Q 2220/00* (2013.01)

(58) Field of Classification Search
CPC .. G06Q 20/401; G06Q 20/36; G06Q 20/3829; G06Q 2220/00; G06Q 20/02;
(Continued)

(56) References Cited

U.S. PATENT DOCUMENTS 10,373,158 B1    8/2019  James et al.
10,558,820 B2    2/2020  Chan et al.
(Continued)

FOREIGN PATENT DOCUMENTS

CN       106815725 B        2/2021
KR       20200136128 A  *  12/2020
WO    WO-2021/146693 A1     7/2021

OTHER PUBLICATIONS

KR_20200136128_A English Description (Year: 2020).*
(Continued)

*Primary Examiner* — Steven S Kim
*Assistant Examiner* — Karlyannie M. Garcia
(74) *Attorney, Agent, or Firm* — Foley & Lardner LLP (57) ABSTRACT

A computer-implemented method for seamlessly processing transactions using distributed ledger technology. The method may comprise: linking one or more conventional accounts hosted in a conventional banking infrastructure to one or more DLT-based client accounts hosted on a distributed ledger, wherein the DLT application comprises a routing address configured to be used in conventional transaction infrastructure using conventional communication protocols; storing one or more wallet identifications for the one or more DLT-based client accounts and a mapping of the one or more wallet identifications to the one or more conventional accounts hosted in the conventional banking infrastructure; exchanging a sequence of messages to execute an asset transfer and complete a transaction lifecycle, the sequence of messages based on the first asset type; updating the distributed ledger based on the asset transfer; and sending appropriate messages to clients.

20 Claims, 4 Drawing Sheets

(51) Int. Cl.
*G06Q 20/36* (2012.01)
*G06Q 20/38* (2012.01)

(58) Field of Classification Search
CPC .... G06Q 20/065; G06Q 20/10; G06Q 20/223; G06Q 20/3678; G06Q 20/389; G06F 16/27

See application file for complete search history.

(56) References Cited

U.S. PATENT DOCUMENTS

| | | | |
|---|---|---|---|
| 10,885,740 B2 | 1/2021 | Higgins et al. | |
| 11,068,886 B2 | 7/2021 | Mayblum et al. | |
| 11,138,576 B2 | 10/2021 | Arora et al. | |
| 2004/0030894 A1 | 2/2004 | Labrou et al. | |
| 2016/0342976 A1 | 11/2016 | Davis | |
| 2017/0323505 A1 | 11/2017 | Gaddam et al. | |
| 2019/0139033 A1* | 5/2019 | Ricotta | G06Q 20/1085 |
| 2019/0272529 A1 | 9/2019 | Itwaru | |
| 2019/0334726 A1 | 10/2019 | Kelly | |
| 2020/0380476 A1 | 12/2020 | Trudeau et al. | |
| 2021/0035211 A1 | 2/2021 | Kapoor et al. | |
| 2021/0158312 A1* | 5/2021 | Arora | G06Q 20/10 |
| 2021/0201293 A1 | 7/2021 | Mossoba et al. | |
| 2021/0398091 A1 | 12/2021 | Yan | |
| 2022/0237599 A1* | 7/2022 | Petersen | G06Q 20/26 |
| 2022/0374880 A1 | 11/2022 | Mallela et al. | |

OTHER PUBLICATIONS

International Search Report and Written Opinion on PCT app. PCT/US2022/45324 dated Feb. 8, 2023 (26 pages).
International Preliminary Report on Patentability for PCT App. PCT/US 2022/045324 dated Apr. 16, 2024 (10 pages).
EPO Extended European Search Report for Application No. 25160532.5 mailing date Apr. 7, 2025, 5 pages.
EPO Office Action for Application No. 25160532.5 mailing date Apr. 22, 2025, 14 pages.

* cited by examiner

SYSTEMS AND METHODS FOR SEAMLESSLY PROCESSING TRANSACTIONS USING DISTRIBUTED LEDGER TECHNOLOGY IN A LEGACY SYSTEM INFRASTRUCTURE

This application claims the benefit of priority as a continuation to U.S. patent application Ser. No. 17/498,622, filed Oct. 11, 2021, the entirety of which is incorporated by reference herein.

TECHNICAL FIELD

This application relates generally to a single platform that enables processing single and multi-asset transactions using distributed ledger technology (DLT) while providing seamless integration with assets held on legacy infrastructure.

BACKGROUND

As the processing power of computers allows for greater computer functionality and the Internet technology era allows for interconnectivity between computing systems, many institutions are shifting towards DLT-based technology to store and maintain the integrity of transaction data as well as to achieve transactional efficiency and to address some of the limitations inherent in current infrastructure for financial transactions. Some of these limitations include (a) transfers of most financial assets involve delays and are usually not available 24×7; (b) fragmentation of ledgers and transfer protocols for different asset types introduce operational complexity both for clients and service providers; and (c) there is no generic infrastructure for making contingent or concurrent payments between two or more parties. While DLT-based storage methods may require more computational resources than conventional methods (e.g., a central database), the immutability of the data within the DLT enables operators to have peace of mind that the data in the DLT is accurate and may not be changed.

With DLT-based storage methods being in relative infancy, a vast majority of asset balances for traditional (non-crypto) assets are held on conventional (non-distributed) ledgers (e.g., a static database). Even if some users move part or all of their asset balances to a distributed ledger, at least some of their transactions may involve transfers to or from accounts which are held on conventional ledgers (i.e. "conventional accounts"). Transfers from and/or to such conventional accounts often involve steps which are different from steps involved in transferring assets between non-conventional accounts. Furthermore, users, especially institutional (non-individual), may have existing systems and processes designed to work with conventional ledgers, and there may be significant integration work, and process revision required for them to adopt DLT-based solutions even for a small part of their holdings. With regulatory frameworks and accounting policies on the treatment of assets held on DLT's still evolving across the world, institutional users operating in multiple jurisdictions may additionally need to undertake regulatory/accounting analysis before adoption of such solutions, and to establish that the asset on the distributed ledger (the 'token') is not seen as a new security (just as any depository receipt is) issued by an issuer different from the issuer of the original asset. All these hurdles may have the impact of slowing down the adoption of DLT-based solutions by institutional users, except for specialized use cases involving a limited number of participants, where the benefits from the use case may justify changes to a limited number of existing systems by all of them to on-board the solution.

Existing solutions for DLT-based assets need to contend with the above issues, and may also suffer additional shortcomings. For example, solutions work well for entities which agree up front to accept the token; they would all be able to execute such transfers efficiently amongst themselves, (e.g., previous solutions may work well for a "closed user group"). However, when an entity receives a token from any of its counterparties, but is unable to find another counterparty within the "closed group" to immediately deploy it to, the entity may need to keep the token until it finds a counterparty to post it to. Inability to use the tokens immediately would lead to increased funding costs being borne by the entity. This further reduces the likelihood of adoption of the token. Another shortcoming is that many of the solutions are for single asset classes or just a single asset (USDC for USD cash). They therefore are not in a position to effect conditional or concurrent multi-asset transfers.

Users may not be able to transfer funds between traditional accounts and cryptographic wallets seamlessly because these account types use incompatible protocols and processes. For instance, in the DLT-based world, wallets may be accessed through cryptographic keys or a wallet interface. In the conventional account world, accounts are accessed via conventional interfaces (graphical user interface or API) or via channels like SWIFT over which messages in standard (e.g., conventional) formats like ISO15022 or ISO20022 may be sent. In the current environment, these communication protocols and channels are distinct and don't support using an integrated approach. Consequently, two users that have DLT-based and conventional accounts respectively may not be able to execute transactions between each other seamlessly, even if they desire to do so.

SUMMARY

For the aforementioned reasons, there is a need for a method and system that enables users to instruct standard transactions on their DLT-based account using conventional interfaces, not needing to undertake any operational or technical enhancements to access basic details of their transactions and balances across one or more asset classes (in which they hold balances), and being able to move assets to and receive assets from conventional accounts (for one or more asset classes) seamlessly and without adding any material processing time. In other words, the method and system should, in addition to providing a wallet and cryptographic key access, give clients the option to operate their DLT wallets in the same way as conventional accounts so that usage of the new platform can be completely transparent from an on-boarding and operating perspective, for transactions types which are available in the conventional world.

The methods and systems described herein aim to provide functionality that enables the above. The method may use an intermediary application that is set up with its own routing address used in conventional transaction infrastructure (e.g. BIC code) to and from which clients can route messages using conventional protocols (e.g. via SWIFT). As described herein, references to a BIC code should be understood to mean a routing address used in a conventional transaction infrastructure. Further, as described herein, references to SWIFT should be understood to mean any financial message service providers. Similarly, a SWIFT authentication key should be understood to be an authentication key for any financial message service in use. The intermediary application may link an account in the conventional infrastructure (e.g. cash account provided by a bank, or securities account provided by a custodian) to one or more client accounts on the DLT (a.k.a. wallets), with the balance on the conventional account matching the aggregate of client balances on the linked wallets for that particular asset; with any external transfer from the conventional account only permitted to be initiated by the intermediary application. In some cases, a conventional account may link to multiple accounts, in which case the conventional account may be an omnibus account. Every DLT wallet may have a wallet identification. For every DLT wallet identification, the intermediary application may maintain a mapping to one or more client-specific conventional account identifications (when a conventional account links to a single wallet, then the identification of that conventional account maps to the wallet identification). For example, wallets may be mapped to conventional accounts in a many-to-one or a one-to-one mapping for any given asset (one wallet would only map to one conventional account for UST holdings, one wallet would only map to one cash account for USD, etc.). When the conventional account is an omnibus account mapping to multiple wallets, then the conventional account identification mapped to wallet identifications would not correspond to any account in the conventional infrastructure. In this case, the DLT may act as a sub-ledger and maintain the golden source of client balances which may not be available in conventional infrastructure.

The intermediary application may have the ability to process conventional messages to carry out asset transfers within the DLT, as well as from conventional accounts onto the DLT, and from the DLT to conventional accounts, as well as to process other conventional messages involved in the transaction lifecycle. As described herein, such processing may include processing of received messages, as well as creation of any new messages. The intermediary application may be permissioned to manage client's cryptographic keys mapped against their unique SWIFT authentication key and/or BIC code. The intermediary application may have the ability to generate standard transaction status messages used in conventional transactions, standard debit and credit confirmation, standard end-of-day balance and transaction reports, and to send these messages via conventional messaging statuses on the wallet and via conventional messaging. The intermediary application may have the capability to let clients use conventional messaging/means and wallets for different components of the same transaction. A cryptographic wallet may provide a private key to the intermediary application, allowing wallet holders one channel to convey instructions to the platform. Thus, the intermediary application can enable all the features listed earlier.

A method for seamlessly processing transactions using distributed ledger technology, comprising: linking, by a distributed ledger technology (DLT) application executed or hosted by one or more processors, one or more conventional accounts hosted in a conventional banking infrastructure (i.e., various kinds of accounts provided by licensed financial institutions such as central banks, commercial banks, custodians, payment banks, etc.) to one or more DLT-based client accounts hosted on a distributed ledger, wherein a balance on each of the one or more conventional accounts matches an aggregate of client balances on one or more DLT-based client accounts for an asset of a first asset type, and wherein any external transfers originating at one of the one or more conventional accounts are only permitted to be initiated by the DLT application, wherein the DLT application comprises a routing address configured to be used in conventional transaction infrastructure to and from which client devices and/or financial institutions can route messages using conventional communication protocols; storing, by the DLT application, one or more wallet identifications for the one or more DLT-based client accounts and a mapping of the one or more wallet identifications to the one or more conventional accounts hosted in the conventional banking infrastructure; wherein the DLT application is permissioned to manage cryptographic keys for the one or more DLT-based client accounts mapped against corresponding authentication keys and/or routing addresses; wherein the DLT application is configured to receive, process, create, and send, to and from client devices, conventional messages for asset transfer between the one or more conventional accounts and the one or more DLT-based client accounts or between the one or more DLT-based client accounts, the asset transfers of a plurality of asset types; wherein the DLT application is configured to receive, process, create, and send, to and from financial institutions, messages for asset transfers; exchanging, by the DLT application, a sequence of messages to execute an asset transfer and complete a transaction lifecycle, the sequence of messages based on the first asset type; and updating, by the DLT application, the distributed ledger based on the asset transfer. Updating the distributed ledger may include updates both during the asset transfer and at the end of the asset transfer (e.g., in the process of detokenization, locking a token initially, and/or burning a token subsequently).

A system for seamlessly processing transactions using distributed ledger technology, the system comprising: an application server comprising a processor executing or hosting a distributed ledger technology (DLT) application, the processor configured to execute or host the DLT application to: link one or more conventional accounts hosted in a conventional banking infrastructure (i.e., various kinds of accounts provided by licensed financial institutions such as central banks, commercial banks, custodians, payment banks, etc.) to one or more DLT-based client accounts hosted on a distributed ledger, wherein a balance on each of the one or more conventional accounts matches an aggregate of client balances on one or more DLT-based client accounts for an asset of a first asset type, and wherein any external transfers originating at one of the one or more conventional accounts are only permitted to be initiated by the DLT application, wherein the DLT application comprises a routing address configured to be used in conventional transaction infrastructure to and from which client devices and/or financial institutions can route messages using conventional communication protocols; store one or more wallet identifications for the one or more DLT-based client accounts and a mapping of the one or more wallet identifications to the one or more conventional accounts hosted in the conventional banking infrastructure; wherein the DLT application is permissioned to manage cryptographic keys for the one or more DLT-based client accounts mapped against corresponding authentication keys and/or routing addresses; wherein the DLT application is configured to receive, process, create, and send, to and from client devices, conventional messages for asset transfers between the one or more conventional accounts and the one or more DLT-based client accounts or between the one or more DLT-based client accounts, the asset transfers of a plurality of asset types; wherein the DLT application is configured to receive, process, create, and send, to and from financial institutions, messages for asset transfers; exchange a sequence of messages to execute an asset transfer and complete a transaction lifecycle, the sequence of messages based on the first asset type; and update the distributed ledger based on the asset transfer.

In one embodiment, a method for tokenization comprises establishing, by a DLT-application executed or hosted by an application server, a connection between the DLT-application and a second application (or group of applications) executed or hosted by server(s) maintained by a financial institution, the DLT-application storing a plurality of digital wallets connected to a distributed ledger and the second application storing a plurality of conventional accounts linked to the plurality of digital wallets (i.e., the DLT-application maintains a mapping of the plurality of wallets to the plurality of conventional accounts); responsive to a transaction request from a first client device, receiving, by the DLT-application from the second application, confirmation of a credit into the recipient account; responsive to receiving the confirmation, transmitting, by the DLT-application to one or more computing devices of the distributed ledger, instructions to update the distributed ledger crediting a destination account based on the transaction; and sending, by the DLT application, a credit confirmation, end of day messages, and other status messages to the first client device.

In another embodiment, a system for tokenization, the system comprises an application server comprising a processor executing a DLT-application, the processor configured to execute or host the DLT-application to establish a connection between the DLT-application and a second application executed by server(s) maintained by a financial institution, the DLT-application storing a plurality of digital wallets connected to a distributed ledger and the second application storing a plurality of conventional accounts linked to the plurality of digital wallets (i.e., the DLT-application maintains a mapping of the plurality of wallets to the plurality of conventional accounts); responsive to a transaction request from a first client device, receive, from the second application, confirmation of a credit into the recipient account; responsive to receiving the confirmation, transmitting, to one or more computing devices of the distributed ledger, instructions to update the distributed ledger crediting a destination account based on the transaction; and sending, by the DLT application, a credit confirmation, end of day messages, and other status messages to the first client device.

In another embodiment, a method for detokenization comprises establishing, by a DLT-application executed or hosted by an application server, a connection between the DLT-application and a second application executed by server(s) maintained by a financial institution, the DLT-application storing a plurality of digital wallets connected to a distributed ledger and the second application storing a plurality of conventional accounts linked to the plurality of digital wallets; receiving, by the DLT-application, a transaction request from a first client device identifying a token; freezing, by the DLT-application, the token; responsive to receiving the transaction request, transmitting, by the DLT-application, a deliver instruction identifying the source account and a destination account to the second application; receiving, by the DLT-application from the second application, confirmation of a debit from the source account; and responsive to receiving the confirmation from the second application, transmitting, by the DLT-application to one or more computing devices of the distributed ledger, instructions to update the distributed ledger debiting the source account based on the token; and sending, by the DLT application, a debit confirmation, end of day messages, and other status messages to the first client device.

In another embodiment, a system for detokenization, the system comprises an application server comprising a processor executing or hosting a DLT-application, the processor configured to execute or host the DLT-application to establish a connection between the DLT-application and a second application executed by server(s) maintained by a financial institution, the DLT-application storing a plurality of digital wallets connected to a distributed ledger and the second application storing a plurality of conventional accounts linked to the plurality of digital wallets; receive a transaction request from a first client device identifying a token; freezing, by the DLT-application, the token; responsive to receiving the transaction request, transmit a deliver instruction identifying the source account and a destination account to the second application; receiving, by the DLT-application from the second application, confirmation of a debit from the source account; and responsive to receiving the confirmation, transmit, to one or more computing devices of the distributed ledger, instructions to update the distributed ledger debiting the source account based on the token; and send a debit confirmation, end of day messages, and other status messages to the first client device.

In another embodiment, a method for token transfers comprises receiving, by a DLT-application, a transaction request from a first client device, the transaction request identifying one or more tokens of one or more distinct assets; validating, by the DLT-application, the transaction request; receiving, by the DLT-application, matching instructions from a second client device; validating, by the DLT-application, the matching instructions; matching, by the DLT-application, the transaction request and the matching instructions; waiting, by the DLT-application, for any specified pre-conditions for the transaction request to be satisfied; settling, by the DLT-application, the transaction; optionally, transmitting, by the DLT-application, messages to a financial account for crediting or debiting the appropriate conventional accounts based on the transaction; and sending, by the DLT application, a debit or credit confirmation, end of day messages, and other status messages to the first client device and/or a second client device associated with the asset transfer.

In another embodiment, a system for token transfers, the system comprises an application server comprising a processor executing or hosting a DLT-application, the processor configured to receive a transaction request from a first client device, the transaction request identifying one or more tokens of one or more distinct assets; validate the transaction request; receive matching instructions from a second client device; validating, by the DLT-application, the matching instructions; match the transaction request and the matching instructions; waiting, by the DLT-application, for any specified pre-conditions for the transaction request to be satisfied; settle the transaction; optionally, transmit messages to a financial account for crediting or debiting the appropriate conventional accounts based on the transaction; and send a debit or credit confirmation, end of day messages, and other status messages to the first client device and/or a second client device associated with the asset transfer.

It is to be understood that both the foregoing general description and the following detailed description are exemplary and explanatory and are intended to provide further explanation of the invention as claimed.

BRIEF DESCRIPTION OF THE DRAWINGS

The accompanying drawings constitute a part of this specification, illustrate an embodiment of the invention, and together with the specification, explain the invention.

DETAILED DESCRIPTION

Reference will now be made to the exemplary embodiments illustrated in the drawings, and specific language will be used here to describe the same. It will nevertheless be understood that no limitation of the scope of the invention is thereby intended. Alterations and further modifications of the inventive features illustrated here, and additional applications of the principles of the inventions as illustrated here, which would occur to a person skilled in the relevant art and having possession of this disclosure, are to be considered within the scope of the invention.

Figure 1:
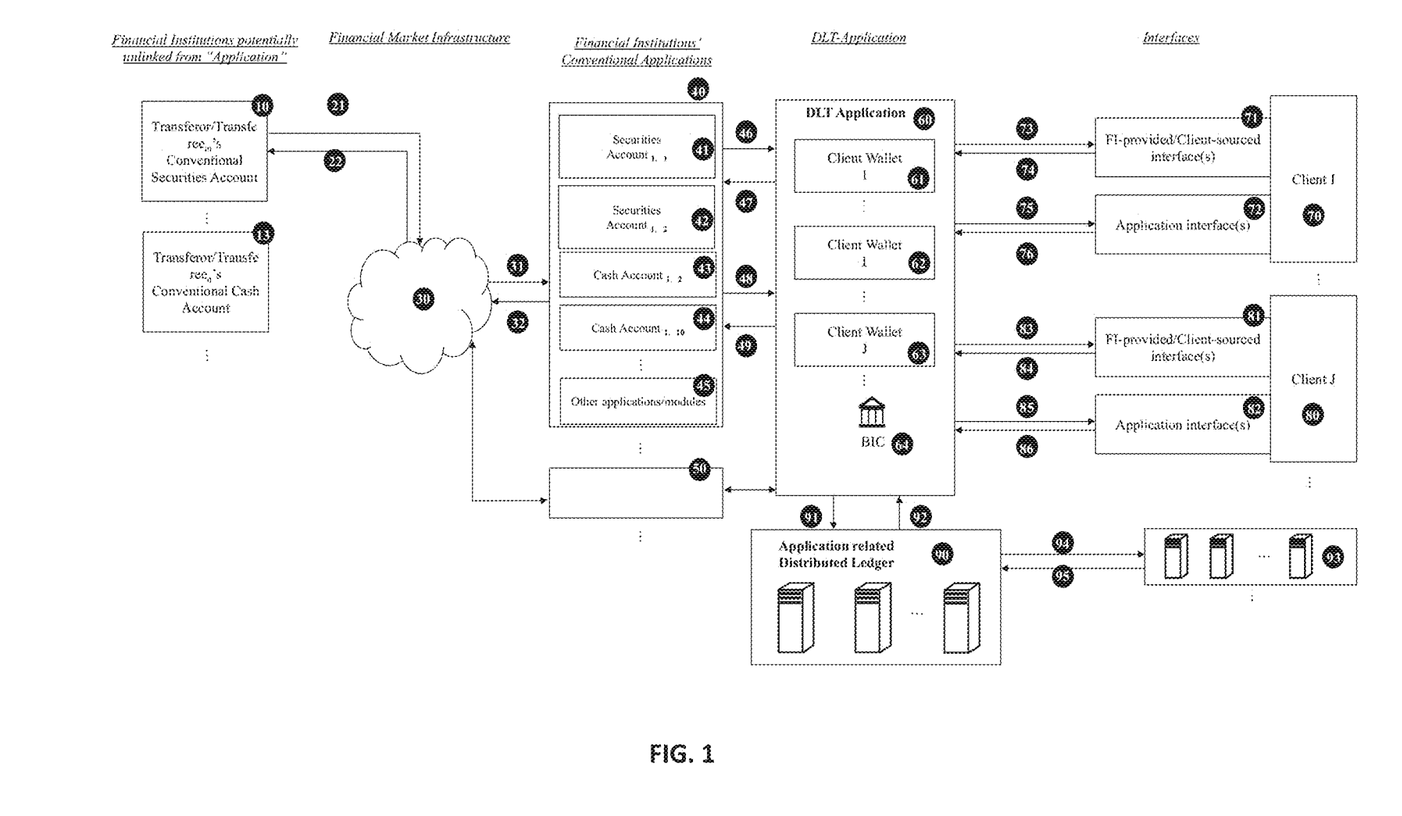
FIG. 1 illustrates an implementation of a computer system for seamlessly processing transactions using distributed ledger technology, according to an embodiment.

FIG. 1 illustrates various components of a system 100 that enables users to instruct standard transactions on their DLT-based account using conventional and DLT application-specific interfaces, in accordance with an embodiment. The system 100 provides a non-limiting example of a computer system that contains a DLT application with a BIC code to which a client device may route messages via a conventional messaging protocol (e.g., SWIFT). The DLT application may store a plurality of wallets for individual users. The DLT application may be able to communicate with a series of in-network and out of network distributed ledgers to maintain the balances for each of the stored wallets and enable the user to perform transactions with conventional user accounts.

The system may include a financial market infrastructure ("FMI") 30. The FMI 30 may include depositories and central banks and include a series of servers and processors that coordinate to facilitate transactions. The FMI 30 may enable different financial institutions to settle financial obligations between different user accounts and/or financial entities (e.g., user accounts of the same or different banks). However, it should be noted that transfers do not always need to go through the FMI 30.

The system may include transferor/transferee accounts 10-13. While only two transferor/transferee accounts are shown in FIG. 1, the system 100 may include any number of such accounts. The transferor/transferee accounts 10-13 may be accounts from which assets are transferred and/or accounts that receive such assets. A transferor account may be an account in which an asset is transferred to a conventional account stored in the set of applications 40 and a transferee account may be an account to which an asset is transferred from a conventional account in the set of applications 40. The transferor/transferee accounts 10-13 may be conventional user financial accounts (e.g., accounts stored in a static database) that are stored on the servers of their respective financial institutions and that keep records of asset ownership by the respective account's owners. In one non-limiting example, the transferor/transferee account 10 may be a conventional securities account and the transferor/transferee account 13 may be a conventional cash account (e.g., an account for holding fiat currency balances such as a Demand Deposit Account offered by a commercial bank). The accounts may perform asset transfers through the FMI 30 or through another network or infrastructure.

In some cases, to perform any transfers, the transferor/transferee accounts 10 or 13 may transfer the securities or money to accounts that are stored on one or more financial institutions' set of financial applications 40 or 50. For instance, the financial institutions' sets of financial applications 40 and 50 may each include one or more applications for different financial assets that store conventional accounts 41-44. The conventional accounts 41 and 42 may be securities accounts and conventional accounts 43 and 44 may be cash accounts. While only four accounts are shown, the sets of financial applications 40 and 50 may include any number of accounts for any type of asset. The conventional accounts 41-44 can store assets received from the transferor/transferee accounts 10 and 13 and transfer assets to such accounts. A DLT application 60 may have established connections with the sets of financial applications 40, 50, and/or any number of other applications of other financial institutions.

In one example, the transferor/transferee account 10 may send an instruction 21 to the FMI 30 for an asset transfer to/from an application-linked conventional account 41 (e.g., an application linked to the DLT application 60) of the set of financial applications 40. As described herein, actions by transferor/transferee accounts 10-13 should be understood to mean actions by the owner or authorized operator of the respective account. The FMI 30 may then send one or more instructions 31 that correspond to the instruction 21 to the conventional account 41. The set of financial applications 40 may then transmit one or more instructions 32 to the FMI 30 confirming the status of the transfer to account 41; the FMI may in turn transmit a corresponding instruction 22 to transferor account 10. The instructions and messaging of the sets of instructions 21, 22, 31, and 32 may be transmitted using conventional communication channels such as SWIFT using standards like ISO15022 or ISO20022.

In some cases, a transferor account and/or a transferee account may be stored on the set of financial applications 40 (i.e., transferors and transferees hold accounts at the financial institution that has a set of financial applications that are coupled with the DLT application 60). In such cases, transactions may be performed without transmitting any messages through the FMI 30.

The sets of financial applications 40 and 50 may be applications that are hosted by servers or other computing devices of different financial institutions. For example, the set of financial applications 40 may store accounts for different types of assets (e.g., securities accounts 41 or 42, or cash or demand deposit accounts 43 or 44). The set of financial applications 40 may also include other applications 45 which may include accounting modules, sanctions screening, reconciliation report uploading, reference and pricing data for assets, etc. The DLT application 60 may integrate with the other applications 45 to avoid duplicating their functionality within the DLT application 60. In another embodiment, the DLT application 60 would build some or all these modules itself or rely on third party modules instead of integrating with the other application 45.

As briefly mentioned above, conventional securities account 41 and 42 may be linked to the DLT application 60. The accounts 41 and 42 may hold one or more than one kind of security. One or more of the conventional securities accounts 41 and 42 may serve as omnibus accounts (wherein the holdings in these accounts map to the holdings of multiple underlying user accounts; in which case a DLT network 90 may operate as a sub-ledger for balances held by client wallets, with the aggregate balances matching the assets held in the corresponding omnibus accounts from amongst the accounts 41 and 42). In other cases, one or more of the accounts 41 and 42 may belong to individual end clients (e.g. clients operating client device 70 or client device 80, described below), and map one-to-one to the account balances held on the DLT network 90 (e.g., the DLT application 60 may maintain DLT wallets 61-63 that maintain a record of the current balance for different client accounts (e.g., 41 and 42)). The DLT application 60 may be authorized to convey instructions to accounts 41 and 42, and to receive status messages and other notifications on these accounts. In some instances, the accounts 41 and 42 may have restrictions so that transfers to other conventional accounts can only be instructed via the DLT application 60. The cash accounts 43 and 44 may operate similarly to the accounts 41 and 42, but may store balances for cash instead of securities. In some embodiments, securities accounts may be omnibus accounts, as described herein, and cash accounts may be per client accounts.

The DLT application 60 may be an application that is configured to accept and process one or more of tokenization, detokenization, and token transfer instructions. As described herein, tokenization refers to creation of an asset on the distributed ledger. In the case of conventional securities or cash, this is on the back of an asset received in a conventional ledger. In the case of omnibus accounts represented on a conventional ledger, a credit into an omnibus account leads to a credit into one of the multiple wallets the balances of which together add up to the balance in the omnibus account. Detokenization refers to destroying an asset on the distributed ledger. In the case of cash and conventional securities, this is usually accompanied by debiting of an asset from a token in a conventional ledger (the sequence of the two debits could change depending on the process). These processes are described in detail below with respect to FIGS. 2 and 3. Token transfers refers to transferring tokens from one account to another account.

The DLT application 60 may, in addition, connect with the conventional accounts 41-44 and other conventional financial applications (e.g., other applications 45). The DLT application 60 may be stored on a server external to any financial institution network and operate as an intermediary application, a ledger (e.g., a distributed ledger), middleware, or a combination of middleware and a ledger between client devices (e.g., the client device 70 or the client device 80) and financial institution applications (e.g., the set of financial applications 40 or the set of financial applications 50). For instance, the DLT application 60 may have or be associated with its own routing address (e.g., a BIC code 64) that can be used to route messages in a conventional financial network. When performing transactions, client devices may include the BIC code 64 in a message header to indicate to route the messages for the transaction to the DLT application 60.

The DLT application 60 may include DLT wallets 61, 62, and 63. The DLT application 60 may include any number of wallets. The DLT wallets 61, 62, and 63 may maintain the balances of the assets that their respective owners have on the DLT network 90 and/or another distributed ledger that may be outside of the financial institution network. The DLT application 60 may update the DLT wallets 61, 62, and 63 periodically based on tokenization, detokenization, token transfers or any other authorized transactions that the clients perform through their respective accounts.

For assets for which the DLT network 90 operates as a sub-ledger, the DLT wallets 61, 62, and 63 may be the 'golden source' of client balances given the standard immutability of distributed ledger technology. The DLT wallets 61, 62, and 63 may be mapped (e.g., have a stored relationship in a relational database) to one of more account numbers for the different assets. In cases where a client-specific conventional account is used (in the set of financial applications 40 or the set of financial applications 50), the conventional account number may be mapped to the wallet (e.g., mapped to an identification of the wallet). For all assets where omnibus accounts are used (in the set of financial applications 40 or the set of financial applications 50), the same client account number could be used (but there may be different numbers for different omnibus accounts) to track sub-ledger balances across different conventional omnibus accounts. This account number, like any conventional account, along with the BIC code 64 for the DLT application 60 can be used to route transactions correctly. This (same) client account number could also be the wallet identification, or may have a one-to-one mapping with the wallet identification.

Advantageously, because of the client account number assigned to each wallet, the BIC code assigned to the DLT application 60, and the ability of the DLT application 60 to process incoming conventional messages sent via the Swift network and to generate outgoing messages, clients can configure new accounts on their internal systems using the BIC code 64 and a client account number mapping to their respective wallets (with such mapping being stored in the DLT application 60) just as they would for any other conventional account they hold at a conventional financial institution. For example, client devices may communicate with the DLT application 60 using the BIC code 64 and the client account number mapping to DLT wallets 61, 62, or 63. This would typically apply in the case of institutional clients which may maintain accounts at multiple financial institutions and may use the BIC code and account number to route their instructions to the appropriate destination. The DLT application 60 has further advantages as described above.

In some cases, the operators of the client devices 70 and 80 might be the same as the owners of the transferor/transferee accounts 10 or 13 (e.g. if "Client I" owns the conventional account 10, and moves assets from the conventional account 10 to the securities account 41 for credit to its wallet on the DLT application 60, then it also plays the role of transferor).

The sets of financial applications 40 and 50 may communicate with the DLT application 60 via sets of instructions 46 and 47 using conventional messaging protocols (e.g., ISO15022 messages sent over a SWIFT network or other standard interfaces (e.g., API's) made available by set of financial applications 40 to its clients). The sets of instructions 46, 47, may be asset transfer instruction messages, status messages, credit or debit confirmations, intraday or end of data balance updates, etc.

The sets of financial applications 40 and 50 may also communicate with the DLT application 60 via custom messaging methods via sets of instructions 48 and 49. The sets of instructions 48 and 49 may have been developed or configured to integrate the DLT application 60 with the set of financial applications 40. For example, the sets of instructions 48 and 49, may include messages to screen for sanctions, retrieve security data attributes, or to reconcile aggregate of balances on DLT wallets and on conventional accounts, etc. The level and functionality of the integration of custom messaging between the DLT application 60 and different financial applications may vary by financial institution (e.g., the financial institution running the set of financial applications 40 may have established a custom messaging protocol with the DLT application 60 but the financial institutions running the set of financial applications 50 may only rely on a conventional messaging protocol, and would thus not use custom messaging except for integration with a smaller set of internal applications). In another embodiment, a financial institution may send sets of instructions 46 or 47, referred to earlier, via custom messaging. As described herein, the sets of instructions 46, 47, 48, and 49 that are exchanged between the DLT application 60 and the set of financial applications 40 are exchanged only with the appropriate or applicable application (e.g., internal application or sub-application) or interface of the set of financial applications 40 and/or the DLT Application 60.

In initiating a transaction that is facilitated by the DLT application 60, a user may access one of two categories of user interfaces (e.g., a conventional user interface 71 or a user interface 72 for a cryptographic wallet) at a client device 70. Similarly, client device 80 could use a conventional user interface 81 or a user interface 82 for a cryptographic wallet. For example, a user may access a financial institution-provided user interface 71 that the client device 70 may present in response to executing a client application that was provisioned to the client device 70 or via a browser. The user interface 71 may be provided by the financial institution at which the client maintains its securities or cash accounts or sourced by the client otherwise (e.g., developed internally by the group entity (e.g., a business or organization) that owns or otherwise operates the client device or sourced from other providers) for viewing account balances or activity, initiating transaction instructions, receiving end-of-period or intra-period (e.g. intra-day reports), monitoring status of earlier requests, carrying out other account-related operations, etc. In some cases, there may be multiple financial-institution provided (or client-sourced) interfaces 71 for accessing different assets or for carrying out different operations related to the same asset. For instance, one interface may be configured to present cash balances, another interface may be configured to present securities balances, etc. Alternatively, one interface may be used to initiate transactions, and another may be used to retrieve and reconcile end of day balances. Such interfaces may allow a user at the client device 70 to configure standard routing details for messages to send to their respective financial institutions (e.g. using BIC code and account number for their cash or securities accounts), and then exchange messages with their financial institution using conventional messaging protocols (including but not limited to ISO15022, ISO20022 messages sent via Swift, or via API's). In one embodiment, the user interfaces route these messages to the DLT application 60 using the client account number and the BIC code of the DLT application 60, and validates received messages from the DLT application 60 using the same BIC code.

When using interfaces 71 or 81, the client devices 70 or 80 may communicate with the DLT application 60 via sets of instructions 73, 74, 83, and 84. The sets of instructions 74 and 84 are instructions sent by the client devices 70 and 80, respectively, and may be instructions to initiate standard asset transfers (i.e., asset transfers types available in conventional networks e.g., cash transfers initiated using MT202). The sets of instructions 73, 74, 83, and 84 may represent groups of instructions or messages that are sent via a conventional protocol between interfaces 71 or 81 and the DLT application 60. Such sets of instructions may include any number of exchanged instructions. The standard asset transfer requests may also be used to initiate detokenization (i.e., destroy a token and transfer the destroyed token's underlying asset to a conventional account that is unlinked from the DLT application (e.g., transferor/transferee accounts 10 or 13)). In operation, the DLT application 60 may be authorized by the different account owners to send and receive conventional sets of instructions to various financial institutions on the account owners' behalf. In cases in which a user does not wish to provide the DLT application 60 with authorization to send such sets of instructions and the DLT application 60 has settings that indicate it is not permitted to transmit sets of instructions for the user, the DLT application 60 can still be configured to receive the sets of instructions 73 and 83 on the user's behalf.

In some cases, the sets of instructions 73 and 83 may represent the sets of instructions received by clients as described above, and may include messages with status updates and EOD messages for various transactions. Advantageously, the sets of instructions 73 and 83 may even be related to transactions that are initiated via one of the application interfaces 72 or 82 (i.e. not just to transactions initiated via the sets of instructions 74 and 84). Accordingly, the DLT application 60 may allow clients the flexibility to specify preferences as to which sets of instructions they receive, and via which channels. A benefit of this feature is that while some advanced users may initiate non-standard or standard transfers (via DLT Application interface 72, using the sets of instructions 76), settlement teams can receive confirmations via conventional channels (e.g., via the sets of instructions 73).

For example, if an entity is an organization, it is not uncommon to have different employees that have different responsibilities in the transaction life cycle, including transaction booking (booking transactions/accepting transactions initiated by counterparty) and reconciliation (based on transaction confirmations and/or EOD or other balance or transaction statements). Thus, some employees responsible for transaction booking may continue using the conventional user interfaces 71 or 81 to initiate standard transactions without changing transaction protocols, some may adopt new interfaces (e.g., the application interfaces 72 or 82) to initiate standard or non-standard transactions (for the avoidance of doubt, use of application interfaces 72 and 82 could be referred to as using a digital wallet that is stored in application 60 or in the client devices 70 or 80), but the employees responsible for reconciliation could still choose to use existing protocols for their reconciliations (messages received in the sets of instructions 73 or 83). Even in the case of non-standard transactions (e.g. transfer out Security A and receive Security B at the same time), the user may receive standard messages on transaction status for each individual asset during the transaction lifecycle (e.g. a credit message for Security B, and a debit message for Security A).

The client devices 70 or 80 may communicate with the DLT application 60 from application interface(s) 72 or 82. The application interface(s) 72 and 82 may be one or more custom interface(s) provided by the DLT application 60 for clients to view wallet balances or activity, initiate transactions, receive end-of-period or intra-period (e.g. intra-day reports), monitor status of earlier requests, and carry out other account-related operations. The DLT application 60 may provide multiple such interfaces, including but not limited to Graphical User Interfaces (GUI) and API's (also, notifications from the DLT application 60 to client devices 70 and 80 could also be sent via pre-specified channels, e.g. email). The application interface(s) 72 and 82 may also transmit sets of instructions 76 and 86 to the DLT application 60 to initiate and cryptographically sign instructions for standard transfers (which would include outgoing-transfer instructions for detokenization and incoming-transfer instructions for tokenization in addition to outgoing and incoming transfer instructions for assets to other wallets) or non-standard asset transfers (defined further) as well as accept "allegements" as is described in detail below. Non-standard asset transfers are those not available via conventional networks, (e.g. transfer out Security A and receive Security B at the same time; or transfer out a specified asset if a defined condition is satisfied). As described herein, allegements may mean that instead of having to enter all details of a transaction which would be matched with details entered by the other counterparty/counterparties, the party is shown details entered by others (via the application interface 72). The party can then choose to accept, modify or reject the transaction.

In the same embodiment, the application user interfaces 72 and 82 may allow the client devices 70 and 80 to receive messages in the sets of instructions 75 and 85 from the DLT application 60. Examples of such messages include, but are not limited to, status messages for requests initiated via the sets of instructions 76 or 86 and EOD messages, as well as copies of some or all messages which could potentially be sent by the DLT application 60 in the sets of instructions 73 or 83 (e.g., if an EOD MT940 is sent in the sets of instructions 73, the same may be visible via the application interface 72 as well). As described herein, the sets of instructions 73, 74, 75, 76, 83, 84, 85, and 86 that are exchanged between the DLT application 60 and the interfaces 71, 72, 81, and 82 are exchanged only with the appropriate or applicable application (e.g., internal application or sub-application) or interface of the DLT Application 60.

Optionally, the application user interfaces 72 and 82 may be used to send outgoing-transfer instructions (to trigger tokenization) to the transferor/transferee accounts 10 or 13 or to instruct incoming-transfer instructions (in the case of detokenization) to the transferor/transferee accounts 10 or 13 if the client of the DLT application 60 is the same as the transferor or transferee, or is otherwise authorized to instruct on behalf of the transferor or transferee.

The DLT application 60 may communicate and update the DLT network 90 as users perform transactions between each other. The DLT network 90 may be a network of validating nodes (e.g., computing devices) and a distributed ledger that maintains a record of the state and balances of wallets (e.g., the wallets 61-63 that are stored by the DLT application 60). The DLT application 60 may communicate with the DLT network 90 via sets of instructions 91 and 92. For example, the DLT application 60 may update DLT network 90 by transmitting messages in the sets of instructions 91 to the DLT network 90 with updates on the state and balance of the wallets 61-63. The DLT network 90 may transmit the sets of instructions 92 to the DLT application 60 to provide the DLT application 60 with the necessary data to complete an operation, process or instruction, and/or to provide the DLT application 60 with the necessary data from the ledger for the DLT application 60 to present to a user (e.g., to present the current holdings in the wallets 61-63 to their respective owners).

In some cases, the DLT application 60 may maintain wallets to access other DLT networks outside of the DLT network 90. For example, the DLT application 60 may maintain wallets to access DLT network 93, which may be a DLT network outside the DLT application 60's trust network/zone. The DLT network 90 may connect to the DLT network 93 to interact with the ledgers for other applications (and the clients connecting to these applications) outside the trust zone. This is to make sure that the applications (e.g., the applications that communicate and/or manage each distributed ledger) and messages and tokens of each of the applications can flow amongst each other (e.g., among the connected application) and can interoperate.

For instance, the DLT network 90 may exchange sets of instructions 94, 95, with DLT network 93 or with nodes of the same DLT network 90 but outside of the DLT application 60's trust network. Accordingly, the sets of instructions 94, 95, and the underlying mechanisms act as an inter-DLT bridge that enable interoperability.

As described herein, the system 100 may include components and applications that conventional systems use to process transactions as well as non-conventional components that are described herein. For example, conventional systems may include transferor/transferee accounts 10-13, FMI 30, sets of instructions 31 and 32, and sets of financial applications 40 and 50. The components that enable the systems and methods described herein and are not present in conventional systems, however, include the DLT application 60, the wallets 61-64, the BIC code 64, the application interfaces 72 and 82 (including channels or protocol that facilitate transfer of the sets of instruction 75, 76, 85, and 86), and integration of the DLT application 60 with the other applications 45 (via the sets of instructions 47-49). Accounts 41-44 may be reconfigured to operate with DLT application 60, but may otherwise be standard accounts. For example, the accounts 41-44 may be set up to accept incoming instructions from the BIC for the DLT Application 60, send outgoing instructions to the BIC for the DLT application 60, restrict (e.g., disallow) outgoing payment instructions originating from any other applications in the set of financial applications 40, etc.

Figure 2:
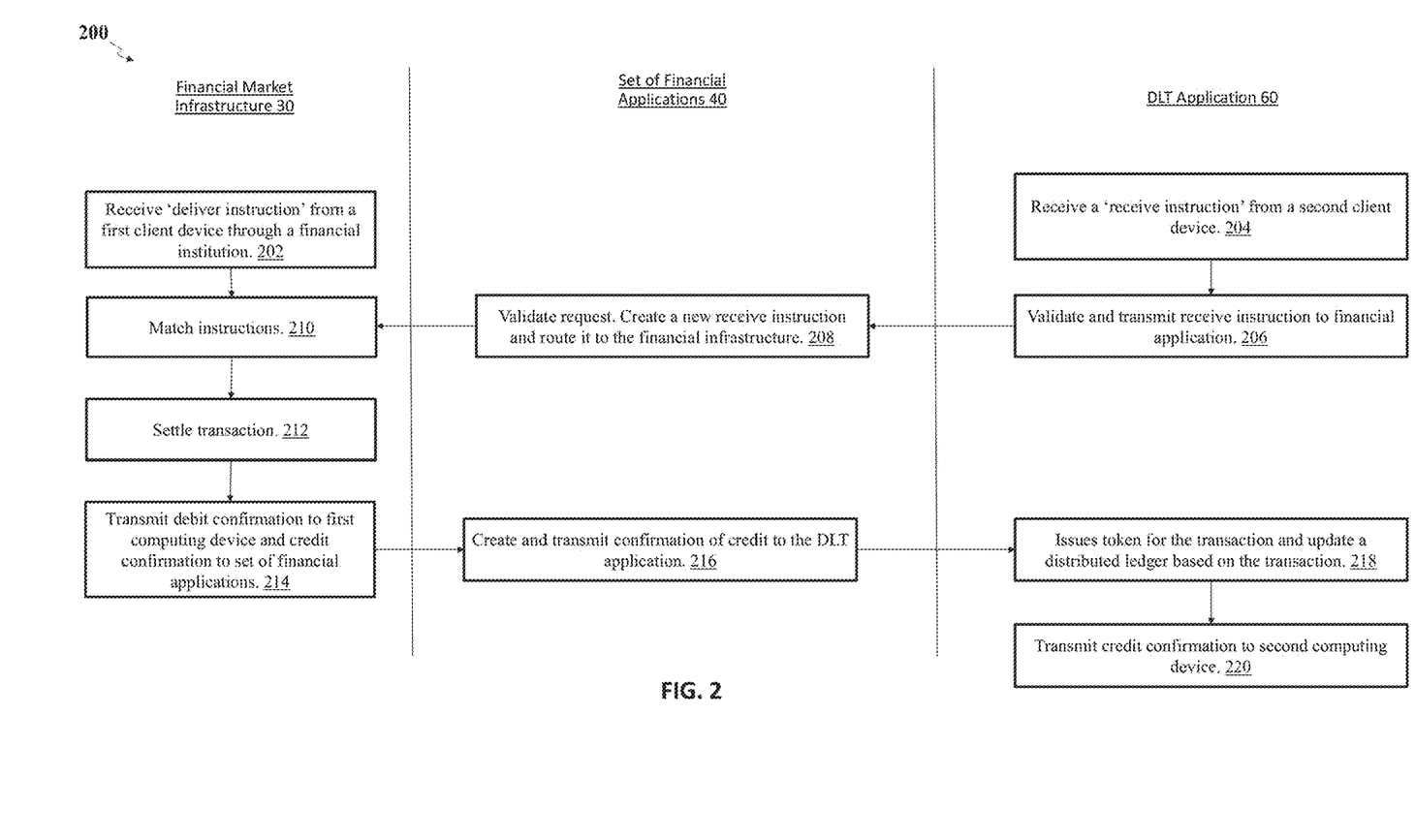
FIG. 2 illustrates a flowchart of a process for tokenization, according to an embodiment.

FIG. 2 illustrates a flowchart depicting operational steps for tokenizing a transaction, according to an embodiment. The method 200 describes how a DLT-enabled application (DLT application) can facilitate a transaction with a conventional account and keep a record of the transaction on a distributed ledger. The DLT application may be the DLT application 60, shown and described with reference to FIG. 1. The method 200 is described below with reference to components (e.g., the FMI 30, the set of financial applications 40, and the DLT application 60) of the system 100 as the system 100 is described with reference to FIG. 1 above. However, it should be noted that the method 200 may be performed by any number of components. Furthermore, other configurations of the method 200 may comprise additional or alternative steps, or may omit one or more steps altogether.

The DLT application may store a plurality of digital wallets connected to a distributed ledger and the second application may store a plurality of conventional accounts linked to the plurality of digital wallets. Additionally, the DLT application may store a mapping of the digital wallets connected to the distributed ledger to the plurality of conventional accounts.

At step 202, the FMI 30 may receive a transaction request from a first client device. The transaction request may be a request to deliver an asset (e.g., a cash or securities asset) from a source account at a financial institution to a destination account on a distributed ledger. The transaction request may include identifications of the source account, a recipient account (e.g., an account hosted by the set of financial applications 40), and the ultimate destination account. The transaction request would be sent using standard asset-specific messages communicated over conventional messages channels (e.g. sets of instructions 31 or 32). Examples of asset-specific messages would include MT542 for securities and MT202 for cash. Such message formats usually allow specification of the source and recipient accounts, and include additional fields which could be used to specify the ultimate beneficiary, i.e. the ultimate destination account. The FMI 30 may receive the transaction request from a server of the financial institution that hosts the transferring account. In some cases, the FMI 30 may receive the transaction from the server after the server carries out a series of validations and checks according to its own internal policies (e.g., balance checks and sanctions screening) and then routes the request to the FMI 30 using conventional messaging.

Optionally, at step 204, the DLT application 60 may receive a "receive instruction" or a "credit pre-advice" from a second client device using conventional messaging (e.g., the sets of instructions 74) or custom messaging (e.g., the sets of instructions 76) depending on the configuration of the established communication channel. The DLT application 60 may receive the instruction or the credit pre-advice based on the type of asset that is being transferred. The receive instruction may include identifiers of the source account and the destination account (which would correspond to the ultimate destination account in the previous step. This corresponds to an individual wallet) and indicate the asset being transferred from the source account to the destination account. In some cases, the receive instruction may also include a BIC code of the DLT application 60 that enables the second client device to communicate with the DLT application 60 using a SWIFT or another conventional communication protocol.

Optionally, at step 206, the DLT application 60 may carry out any necessary validation and then create and send a new "receive instruction" to the set of financial applications 40. The "receive instruction" that the DLT application 60 creates may be distinct from the original "receive instruction" received from the client; that instruction was sent by the authorized client to DLT application. The new receive instruction may be sent by the DLT application 60, which is authorized to send instructions to one or more accounts maintained in the set of financial applications 40. This new receive instruction may set the source account the same as in the original receive instruction, but would set the destination account as the account in the set of financial applications 40 which maps to the wallet for the asset in question, and may also specify the ultimate destination account, which would be the destination account in the original receive request. The DLT application 60 may send the receive instruction to the set of financial applications 40 using conventional messaging or custom message depending on the configuration of the established communication channel between the DLT application 60 and the set of financial applications 40 (e.g., via the sets of instructions 47 or 49).

Optionally, at step 208, the set of financial applications 40 may validate the "receive instruction" that it receives from the DLT application 60. The set of financial applications 40 may do so using internal policies with various rules indicating how to validate such receive instructions. Upon validation, the set of financial applications 40 may route the receive instruction to the FMI 30 using a conventional messaging protocol.

Optionally, at step 210, the FMI 30 may match the receive instruction with the transaction request from the first client device. For example, the FMI 30 may compare the attributes (e.g., the different account identifiers and/or the identification of the asset) of the two requests and determine whether the attributes match. If the FMI 30 determines the assets do not match, the FMI 30 may generate an error message and stop the transaction from occurring. Otherwise, if the FMI 30 determines the instructions match, at step 212, the FMI 30 may settle the transaction by crediting the asset to the recipient account and debiting the asset from the source account. At step 214, the FMI 30 may transmit a debit confirmation of the transaction to the first computing device (e.g., to the source account that the first computing device is accessing) to indicate the transaction was successful. The FMI may also transmit a message to the set of financial applications 40 indicating the credit to the recipient account. The FMI may transmit such messages using a conventional messaging protocol.

At step 216, the set of financial applications 40 may transmit a confirmation of the credit to the DLT application 60. The set of financial applications 40 may transmit the confirmation using conventional messaging (e.g., sets of instructions 46) or custom messaging (e.g., sets of instructions 48). The set of financial applications 40 may create and transmit a new credit confirmation in a message including an identifier of the destination account of the transaction as the ultimate beneficiary of the transaction. At step 218, the DLT application 60 may issue a token for the transaction (e.g., the DLT application 60 may credit the asset of the transaction into the destination account) by exchanging messages to and from the distributed ledger for which the DLT application 60 maintains digital wallets indicating the transaction and the credit into the destination account.

At step 220, the DLT application 60 may transmit a credit confirmation in addition to other messages (e.g., transaction status messages, intraday statement, end of day statements, etc.) to the destination account (e.g., to the second client device accessing the destination account). However, if the settlement fails (e.g., if the receive instructions did not match the transaction request), the DLT application 60 may transmit a message to the destination account to indicate the transaction could not be processed. Additionally, if the DLT application 60 receives a cancellation message for the destination account before the transaction has finished processing, the DLT application 60 may transmit a message to the set of financial applications 40 to cancel and stop the transaction from occurring.

In some cases, the recipient account in the set of financial applications 40 may not be an omnibus account. In such cases, the designation of the ultimate destination account may not be needed at any stage and the recipient account may be the ultimate beneficiary account of the transaction.

In some cases, if the user owns both the source account and the destination account, the user may request the DLT application to initiate the 'deliver instruction' which is usually received from a first client device at step 202. The user may only do so, in some cases, if the DLT application is authorized to do so (e.g., has the appropriate account permissions).

Further, in some cases, depending on the asset in question, a transfer over a conventional settlement network may not need matching instructions (for example, for transferring USD, it may suffice to just have a delivery instruction). In such cases, steps 204, 206, 208 and/or 210 may be skipped.

These are just illustrative flows for tokenization. The process for tokenization (and detokenization) may vary based on the underlying financial instrument being tokenized. The above process applies for securities and cash. The DLT application 60 may also be configured for other instruments (e.g. letter of credit). In such cases, the process would change as other asset classes may be get instantiated using different methods. For instance, digital native assets may never have a conventional format and a trade receivable token might get created when party A accepts a liability to pay party B in the future. As described herein, digital native assets may be crypto assets, represented on a DLT (with an assigned ownership), that do not have an equivalent asset representation in conventional financial infrastructure; these digital native assets may or may not represent a physical asset.

Figure 3:
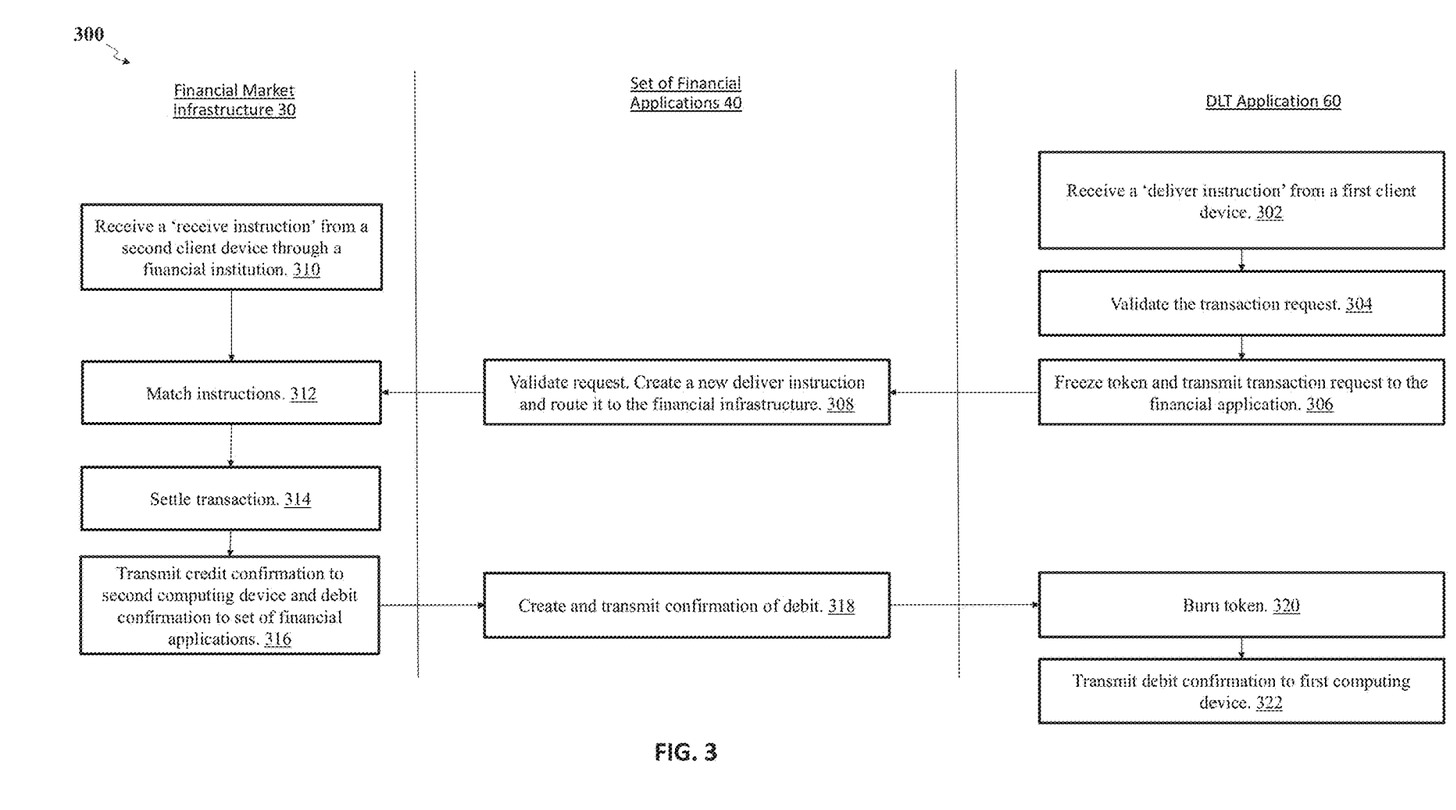
FIG. 3 illustrates a flowchart of a process for detokenization, according to an embodiment.

FIG. 3 illustrates a flowchart of a process for detokenization, according to an embodiment. The method 300 describes how a DLT enabled application can facilitate a transaction with a conventional account and keep a record of the transaction on a distributed ledger. The DLT application may be the DLT application 60, shown and described with reference to FIG. 1. The method 300 is described below with reference to components (e.g., the FMI 30, the set of financial applications 40, and the DLT application 60) of the system 100 as the system 100 is described with reference to FIG. 1 above. However, it should be noted that the method 300 may be performed by any number of components. Furthermore, other configurations of the method 300 may comprise additional or alternative steps, or may omit one or more steps altogether.

At step 302, the DLT application 60 may receive a deliver instruction from a first client device. The deliver instruction may be an instruction to transfer an asset from a source account hosted by the DLT application (e.g., a digital wallet) into a destination account stored in a conventional system. The deliver instruction may include identifiers of the source account and the destination account. For example, the deliver instruction may be to transfer an asset to a particular transferee account (e.g., transferor/transferee account 10 or 13) from a given wallet (e.g., one of wallets 61-63). In some cases, the deliver instruction may include a BIC code for the DLT application 60 to enable the deliver instruction to be routed to the DLT application 60 using SWIFT messaging (e.g., sets of instructions 84). At step 304, the DLT application 60 may validate the transaction request to verify that it is a valid request.

At step 306, the DLT application 60 may freeze the balance of the source account (e.g., the token). By doing so, the DLT application 60 may make the balance unavailable for any transfers. The DLT application 60 may then create a new delivery instruction. This new delivery instruction may indicate the destination account (which would be the same as the destination account in the original request received from the client), but the source account would now be indicated as the conventional account in the set of financial applications 40 to which the balance in the wallet is mapped for the particular asset in question. This new delivery instruction may include details of the ultimate source account (the wallet Id). The DLT application 60 may then route the transaction request to the set of financial applications 40, wherein the transaction request is routed to the set of financial applications 40. The DLT application 60 may transmit the transaction request to the set of financial applications 40 using conventional or custom messaging (e.g., via the sets of instructions 47 or 49).

Optionally, at step 308, the set of financial applications 40 may validate the request and route the request to the FMI 30. The set of financial applications 40 may validate the request using conventional request validation policies. The set of financial applications 40 may then route the request to the FMI 30. The set of financial applications 40 may do so using conventional messaging protocols (e.g., via the sets of instructions 32).

Optionally, at step 310, the FMI 30 may receive a receive instruction from a second client device. The FMI 30 may receive the receive instruction from the second client device through the financial institution that maintains the destination account that was identified in the transaction request from the first client device. The FMI 30 may receive the receive instruction after the financial institution validates the receive instruction and routes the receive instruction to the FMI 30 via a conventional message protocol). The receive instruction may include identifications of the destination account, the source account, and the ultimate source account. The receive instruction may include a reference to the asset being transferred to the destination account. The FMI 30 may receive the receive instruction via the instruction 21.

Optionally, at step 312, the FMI 30 may match the receive instruction with the transaction request from the first client device. The FMI may match the receive instruction with the transaction request in a similar manner to the manner described above (e.g., compare the attributes (e.g., the different account identifiers and/or the identification of the asset) of the two requests and determine whether the attributes match). If the FMI 30 determines the assets do not match, the FMI 30 may generate an error message and stop the transaction from occurring. Otherwise, if the FMI 30 determines the assets match, at step 314, the FMI 30 may settle the transaction by crediting the asset to the destination account and debiting the asset from the recipient account stored on the set of financial applications 40. At step 316, the FMI may transmit (via the sets of instructions 22) a credit confirmation to the destination account being accessed by the second computing device and transmit (via the sets of instructions 31) a confirmation message for the debit to the set of financial applications 40.

At step 318, the set of financial applications 40 may receive the debit confirmation (i.e., the debit from the conventional account in the set of financial applications 40 which maps to the wallet from which the asset is being transferred) from the FMI 30 and then create and transmit to the DLT application 60 a new confirmation of the debit from the wallet. The set of financial applications 40 may transmit the confirmation to the DLT application 60 using a conventional communication protocol or a custom messaging protocol (e.g., via the sets of instructions 46 or 48). At step 320, the DLT application 60 may receive the confirmation and burn the previously frozen token in the source account (e.g., debit the asset of the transaction from the source account). At step 322, the DLT application 60 may transmit a debit confirmation in addition to other transaction details (e.g., transaction status messages, intraday statement, end of day statements, etc.) to the first computing device (e.g., to the source account that the first computing device is accessing). The DLT application 60 may do so using conventional messaging protocols (e.g., the sets of instructions 84 and 86) or custom messaging protocols (e.g., via the sets of instructions 83 and 85).

In some cases, if the same entity owns both the source account (wallet on 60) and the destination account (e.g., the transferor/transferee account 10 or 13), the user may request the DLT application 60 to initiate the 'receive instruction', which is usually received from a second client device at step 310. The user may only do so, in some cases, if the DLT application 60 is authorized to do so (e.g., has the appropriate account permissions).

Further, in some cases, depending on the asset in question, a transfer over a conventional settlement network may not need matching instructions (for example, for transferring USD, it may suffice to just have a delivery instruction). In such cases, step 312 and 314 may be skipped.

In some cases, the recipient account in the set of financial applications 40 is not an omnibus account. In such cases, the designation of the ultimate source account may not be needed at any stage.

Figure 4:
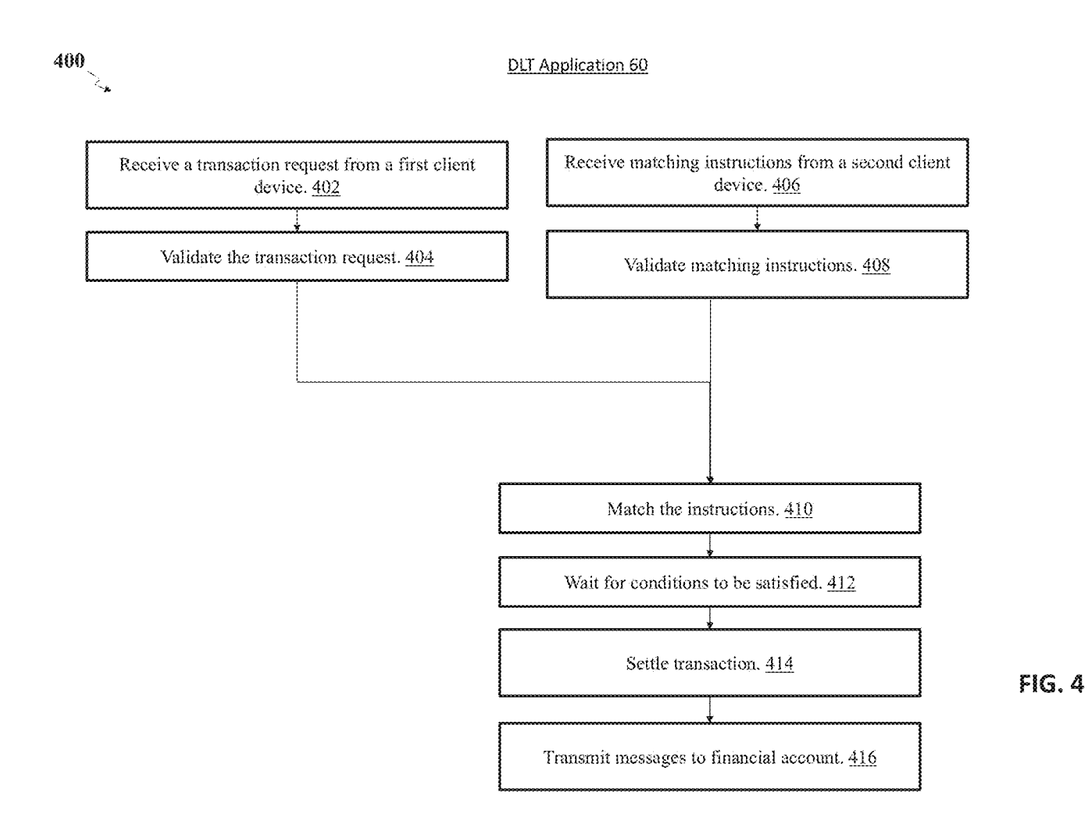
FIG. 4 illustrates a flowchart of a process for token transfer, according to an embodiment.

FIG. 4 illustrates a flowchart of a process for token transfer, according to an embodiment. The method 400 describes how a DLT enabled application can facilitate a token transfer between two wallets of the distributed ledger to which the DLT enabled application is linked. The DLT application may be the DLT application 60, shown and described with reference to FIG. 1. The method 400 is described below with reference to components (e.g., DLT application 60) of the system 100 as the system 100 is described with reference to FIG. 1 above. However, it should be noted that the method 400 may be performed by any number of components. Furthermore, other configurations of the method 400 may comprise additional or alternative steps, or may omit one or more steps altogether.

At step 402, the DLT application 60 may receive a transaction request identifying one or more tokens, and involving one or more counterparty accounts (in the simplest case, this would be a request to transfer a token from a source account to a destination account). Each account may be a digital wallet on the distributed ledger associated with the DLT application 60. In some embodiments, the accounts may include accounts on other distributed ledgers. The DLT application 60 may receive the transaction request from a first client device that is accessing the account through a user interface (e.g., financial institution-provided/client-sourced interface 71 or a DLT application user interface 72). The user may use the user interface 71 and the sets of instructions 74 for standard transfers (defined above), or the application user interface 72 and via the sets of instructions 76 for standard or non-standard asset transfers.

At step 404, the DLT application 60 may validate the transaction request, carrying out any required checks and/or rules in doing so. Optionally, at step 406, the DLT application 60 may receive a matching instruction from a second client device. A user accessing the second client device may send the instruction using the conventional user interface (e.g., the sets of instructions 84) for matching standard transfer requests. Alternatively, the user may send the instruction using the DLT application user interface (e.g., via the sets of instructions 86) for matching standard or non-standard asset transfer requests, or accepting "allegements" of transactions initiated by the first client device. Advantageously, by implementing the systems and methods described herein, even if the first client sends a standard instruction via conventional interface, the second client could use a conventional interface or a custom interface. The second client device may not be required to provide a matching instruction if the DLT application 60 has been configured to not require such matching instructions if certain conditions are met. These conditions may be based on attributes like asset type, transaction type, transaction amount, etc. (e.g., it may not require matching instructions for a one-legged transfer of certain assets below a particular amount). Additionally, the second client device may not be required to provide matching instructions if the second client device has previously specified a preference to accept incoming transfers if certain conditions are met. These conditions may be based on attributes such as the asset type, transaction type, counterparty details, transaction time, transaction amount, etc. (e.g., a US party may accept transactions under $1000 from Asian counterparties during Asian business hours, which are outside US business hours). At step 408, the DLT application 60 may validate the matching instructions.

In some cases, DLT application 60 may be configured to require matching transactions at an asset and transaction type level. This may allow the DLT application 60 to standardize protocol for transfers for different assets (e.g., even for cash token transfers, it could mandate the need for a matching instruction to be provided).

In some cases, the transaction may have more than two legs (e.g., entity A may transfer 100 units of asset 1 to entity B, and entity B may transfer 50 units of asset 2 to entity C. In such cases, the parties to each portion of the transaction may similarly provide instructions to the DLT application 60 for validation and matching.

At step 410, the DLT application 60 may match the instructions from each of the entities (e.g., the DLT application 60 may match the instructions of all of the transaction requests, receive instructions, and/or deliver instructions). In response to the instructions matching, at step 412, the DLT application 60 may wait on any conditions that need to be satisfied before the transaction can be executed. In doing so, the DLT application 60 may apply any applicable priority rules. At step 414, the DLT application 60 may settle the transaction (e.g., single or multiple-legged transaction) by transferring the tokens of the transactions between the wallets identified in the requests and maintained by the DLT application 60. The DLT application 60 may update the distributed ledger to indicate the transaction went through.

In case any transfers involve assets for which the distributed ledger does not act as sub-ledger (e.g., there is a client-specific account held in conventional infrastructure), the DLT application 60 may reflect the transaction in client-specific accounts by passing on appropriate messages to one of set of financial applications 40 or 50. The DLT application 60 may do so using custom messaging protocols (e.g. sets of instructions 49).

At step 416, the DLT application 60 may transmit messages to the client devices that initiated and/or took part in the transaction. For example, the DLT application 60 may send transaction status messages, settlement confirmations, intraday and end of day statements to the client devices. The DLT application 60 may do so using conventional communication protocols (e.g., in sets of instructions 73 or in sets of instructions 83) and/or custom protocols (e.g., using the sets of instructions 75 or the sets of instructions 85).

In one non-limiting example, in the case of non-standard transactions involving more than one asset transfer, the DLT application 60 may have the capability to send conventional messages for individual legs of the trade, with a common transaction reference. Thus, if the DLT application 60 executes a trade where entity I pays entity J EUR 1000, entity J pays entity I USD 600 and entity J pays entity K USD 580 at the same time (which is a non-standard instruction), the DLT application 60 can send debit and credit confirmations for the three individual legs. This ensures that reconciliation systems used by clients can process transfers arising from non-standard transactions as well.

The foregoing method descriptions and the process flow diagrams are provided merely as illustrative examples and are not intended to require or imply that the steps of the various embodiments must be performed in the order presented. The steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, and the like. When a process corresponds to a function, the process termination may correspond to a return of the function to a calling function or a main function.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the invention. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A method for seamlessly processing transactions using distributed ledger technology, comprising:

establishing, by a distributed ledger technology (DLT) application executed or hosted by one or more processors, (i) a first connection with a banking computing application executed by a banking computing infrastructure using a routing address configured to be used in communication with a first communication protocol with which client devices and the banking computing application can route messages through the distributed ledger technology application, and (ii) a second connection with one or more nodes hosting a distributed ledger via a second communication protocol;

linking, by the distributed ledger technology application over the established first connection with the banking computing application executed by the banking computing infrastructure via the first communication protocol, one or more accounts hosted in the banking computing infrastructure to one or more DLT-based client accounts hosted on the distributed ledger;

storing, by the distributed ledger technology application, one or more wallet identifications for the one or more DLT-based client accounts and a mapping of the one or more wallet identifications to the one or more accounts hosted in the banking computing infrastructure;

receiving, by the distributed ledger technology application from a client device through the first communication protocol using the routing address of the distributed ledger technology application, a receive instruction to complete an asset transfer to transfer an asset from a source account hosted in the banking computing infrastructure to a DLT-based client account, the receive instruction comprising an identifier of the source account, an identifier of the DLT-based client account, and the routing address of the distributed ledger technology application;

determining, by the distributed ledger technology application, a destination account hosted in the banking computing infrastructure by comparing the identifier of the DLT-based client account from the receive instruction to the mapping of the one or more wallet identifications to the one or more accounts hosted in the banking computing infrastructure;

generating, by the distributed ledger technology application using the established first connection with the routing address of the distributed ledger technology application and via the first communication protocol, a new receive instruction comprising an identification of the destination account, the identifier of the source account, and the asset being transferred to the destination account, to the banking computing application executed by the banking computing infrastructure to complete the asset transfer;

receiving, by the distributed ledger technology application over the established first connection and via the first communication protocol, an indication of completion of the asset transfer; and generating, by the distributed ledger technology application, an instruction to cause, over the established second connection and via the second communication protocol, the one or more nodes maintaining the distributed ledger to add a record of the asset transfer to the distributed ledger, updating the DLT-based client account.

2. The method of claim 1, wherein a wallet owner of the DLT-based client account is authorized to instruct a transferor/transferee account of the banking computing infrastructure and instructs the transferor/transferee account via the distributed ledger technology application.

3. The method of claim 1, further comprising:
determining one or more transaction conditions have been met; and
executing the asset transfer in response to the determination that the one or more transaction conditions have been met.

4. The method of claim 3, comprising transmitting, by the distributed ledger technology application, debit or credit confirmations to each account involved in the asset transfer.

5. The method of claim 1, wherein the asset transfer is a transfer of cash, and wherein the asset transfer is executed in response to the new receive instruction matching a deliver instruction for the asset transfer.

6. The method of claim 5, wherein the distributed ledger technology application is configured to require matching instructions for the asset transfer unless a client device associated with the asset transfer has previously specified a preference to accept incoming transfers if one or more conditions are met and the one or more conditions are met.

7. The method of claim 1, wherein a wallet owner of the DLT-based client account is authorized to instruct a transferor/transferee account and instructs the transferor/transferee account via the distributed ledger technology application.

8. The method of claim 1, comprising:
receiving, by the distributed ledger technology application, a message initiating the asset transfer from the client device via the first communication protocol; and
transmitting, by the distributed ledger technology application, subsequent messages with the client device or a second client device via the second communication protocol.

9. The method of claim 1, comprising:
receiving, by the distributed ledger technology application, a first message from the client device via a custom communication protocol; and
receiving, by the distributed ledger technology application, a second message from a second client device via a SWIFT communication protocol.

10. The method of claim 1, further comprising:
updating, by the distributed ledger technology application, the distributed ledger as an intermediate step while exchanging a sequence of messages to execute the asset transfer.

11. The method of claim 1, comprising exchanging, by the distributed ledger technology application, a sequence of messages with one or more financial institutions via the first communication protocol.

12. The method of claim 1, wherein any external transfers originating at one of the one or more accounts linked to DLT client-based accounts are only permitted to be initiated by the distributed ledger technology application.

13. A system for seamlessly processing transactions using distributed ledger technology, the system comprising:
an application server comprising a processor executing or hosting a distributed ledger technology (DLT) application, the processor configured to execute or host the distributed ledger technology application to:
establishing, by a distributed ledger technology (DLT) application executed or hosted by one or more processors, (i) a first connection with a banking computing application executed by a banking computing infrastructure using a routing address configured to be used in communication with a first communication protocol with which client devices and the banking computing application can route messages through the distributed ledger technology application, and (ii) a second connection with one or more nodes hosting a distributed ledger via a second communication protocol;
link, over the established first connection with the banking computing application executed by the banking computing infrastructure via the first communication protocol, one or more accounts hosted in the banking computing infrastructure to one or more DLT-based client accounts hosted on a distributed ledger;
store one or more wallet identifications for the one or more DLT-based client accounts and a mapping of the one or more wallet identifications to the one or more accounts hosted in the banking computing infrastructure;
receive, from a client device through the first communication protocol using the routing address of the distributed ledger technology application, a receive instruction to complete an asset transfer to transfer an asset from a source account hosted in the banking computing infrastructure to a DLT-based client account, the receive instruction comprising an identifier of the source account, an identifier of the DLT-based client account, and the routing address of the distributed ledger technology application;
determine a destination account hosted in the banking computing infrastructure by comparing the identifier of the DLT-based client account from the receive instruction to the mapping of the one or more wallet identifications to the one or more accounts hosted in the banking computing infrastructure;
generate, using the established first connection with the routing address of the distributed ledger technology application and via the first communication protocol, a new receive instruction comprising an identification of the destination account, the identifier of the source account, and the asset being transferred to the destination account, to the banking computing application executed by the banking computing infrastructure to complete the asset transfer;

receive, over the established first connection and via the first communication protocol, an indication of completion of the asset transfer; and generate an instruction to cause, over the established second connection and via the second communication protocol, the one or more nodes maintaining the distributed ledger to add a record of the asset transfer to the distributed ledger, updating the DLT-based client account.

14. The system of claim 13, wherein a wallet owner of the DLT-based client account is authorized to instruct a transferor/transferee account of the banking computing infrastructure and instructs the transferor/transferee account via the distributed ledger technology application.

15. The system of claim 13, wherein the processor is further configured to:

determine one or more transaction conditions have been met; and execute the asset transfer in response to the determination that the one or more transaction conditions have been met.

16. The system of claim 15, wherein the processor is configured to transmit debit or credit confirmations to each account involved in the asset transfer.

17. The system of claim 13, wherein the asset transfer is a transfer of cash, and wherein the asset transfer is executed in response to the new receive instruction matching a deliver instruction for the asset transfer.

18. The system of claim 17, wherein the processor is configured to require matching instructions for the asset transfer unless a client device associated with the asset transfer has previously specified a preference to accept incoming transfers if one or more conditions are met and the one or more conditions are met.

19. The system of claim 13, wherein a wallet owner of the DLT-based client account is authorized to instruct a transferor/transferee account and instructs the transferor/transferee account via the distributed ledger technology application.

20. The system of claim 13, wherein the processor is configured to:

receive a message initiating the asset transfer from the client device via the first communication protocol; and transmit subsequent messages with the client device or a second client device via the second communication protocol.

* * * * *